C. A. PERSONS.
HANDLE GRIP.
APPLICATION FILED OCT. 19, 1918.

1,345,505. Patented July 6, 1920.

Witness:
C. F. Wesson.

Inventor.
C. A. Persons
by attorneys.
Southgate & Southgate

UNITED STATES PATENT OFFICE.

CHARLES A. PERSONS, OF WORCESTER, MASSACHUSETTS.

HANDLE-GRIP.

1,345,505.  Specification of Letters Patent.  Patented July 6, 1920.

Application filed October 19, 1918. Serial No. 258,804.

*To all whom it may concern:*

Be it known that I, CHARLES A. PERSONS, a citizen of the United States, residing at Worcester, in the county of Worcester and State of Massachusetts, have invented a new and useful Handle-Grip, of which the following is a specification.

This invention relates to a type of handle grip particularly adapted for use on the handle bars of bicycles, motorcycles, and other similar machines, but also adapted for use on implements, tools, whips, and many other articles having handles.

Grips of this general type, as heretofore commonly made, have consisted of a wooden form or shell over which a leather casing was tightly secured, the unfinished end of the casing being concealed beneath a metal band or cap.

It is the general object of my invention to improve the construction of such handle grips by providing a grip in which the metal band is omitted, and in which the open end of the grip is finished by folding inward the unfinished end of the casing and by securing this folded end in an annular recess in the open end of the grip.

Further features of my invention relate to arrangements and combinations of parts which will be hereinafter described and more particularly pointed out in the appended claim.

A preferred form of my invention is shown in the drawings, in which—

Figure 1:
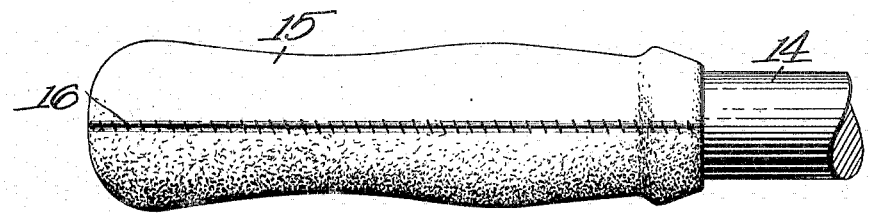
Figure 1 is a side view of my improved handle grip.
Figure 2:
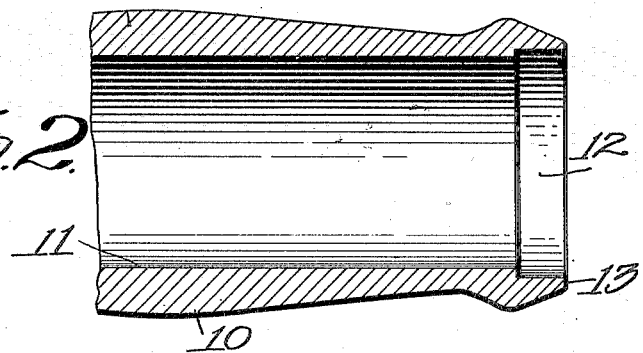
Fig. 2 is a partial longitudinal sectional view of the form or shell.
Figure 3:
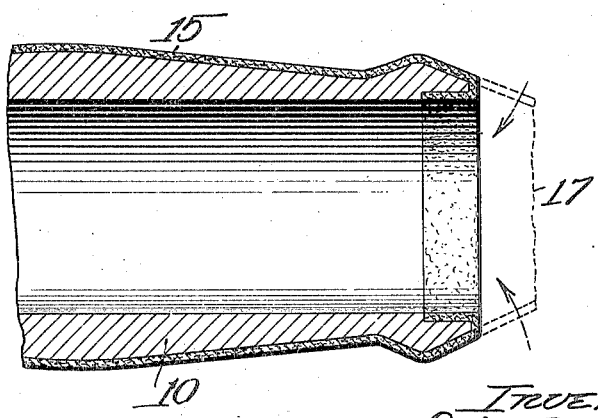
Fig. 3 is a partial longitudinal sectional view of a finished grip.

Referring to the drawings, my improved handle grip in its preferred form comprises a shell or form 10 having a cylindrical recess 11 therein and having also an enlarged annular recess 12 adjacent its open end 13. This shell is commonly formed of wood, for which any other suitable material may be substituted. The cylindrical recess 11 is of such diameter that it fits snugly over the handle bar 14 for which the grip is designed. An outer casing or covering 15 is provided for the grip, this casing being commonly formed of a single piece of leather having its longitudinal edges united by stitching 16. This casing is closed at one end and at the opposite end has an unfinished edge 17.

In assembling the parts forming my improved grip, the casing 15 is drawn over the shell 10, and into close engagement therewith. The unfinished end 17 of the casing is then folded inward around the open end 13 of the shell, and is disposed within the annular recess 12. The casing 15 and its folded end 17 are preferably secured to the shell by the use of a suitable glue or cement between the parts. If necessary, the casing may be dampened or receive other preliminary treatment to render it more flexible before it is drawn over the shell.

Having thus assembled the parts, it will be seen that I have provided a handle grip in which the wall of the grip at its open end is entirely covered by the outer casing, and in which the unfinished end of the casing is securely held in place, when in use, by the bar to which the grip is applied. By this construction I avoid the use of a metallic band or cap for securing the unfinished end of the casing, thus procuring economy in material and decreased cost of manufacture. It will be understood that textile fabric or other suitable material may be used in place of leather to form the casing 15.

Having thus described my invention, it will be evident that changes and modifications can be made therein by those skilled in the art without departing from the spirit and scope thereof as set forth in the claim, and I do not wish to be otherwise limited to the details herein disclosed, but what I claim is—

A handle grip comprising a shell having a cylindrical recess therein with one closed and one open end, said recess being annularly enlarged adjacent its open end, and a tubular casing for said shell formed of flexible material and closed at one end only, the opposite open end of said casing being folded inward and backward around the open end of said shell and being positioned in the annular recess in the open end thereof.

In testimony whereof I have hereunto affixed my signature.

CHARLES A. PERSONS.